Oct. 10, 1944.    E. F. MEREDITH    2,359,928
RAT TRAP
Filed June 12, 1943

Inventor
Earl F. Meredith

By Clarence A. O'Brien
and Harvey B. Jacobson
Attorneys

Patented Oct. 10, 1944

2,359,928

UNITED STATES PATENT OFFICE 2,359,928

RATTRAP

Earl F. Meredith, Cedar Grove, Ga.

Application June 12, 1943, Serial No. 490,653

1 Claim. (Cl. 43—96)

The present invention relates to new and useful improvements in rat traps of the type comprising a wooden base having mounted thereon a spring actuated wire jaw.

The primary object of the invention is to provide, in a manner as hereinafter set forth, a rat trap of the aforementioned character comprising simple but novel means whereby said trap may be conveniently suspended in various positions on a vertical support such, for example, as the walls, joists, etc, of a barn or other building.

Other objects of the invention are to provide a rat trap of the aforementioned character which will be highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
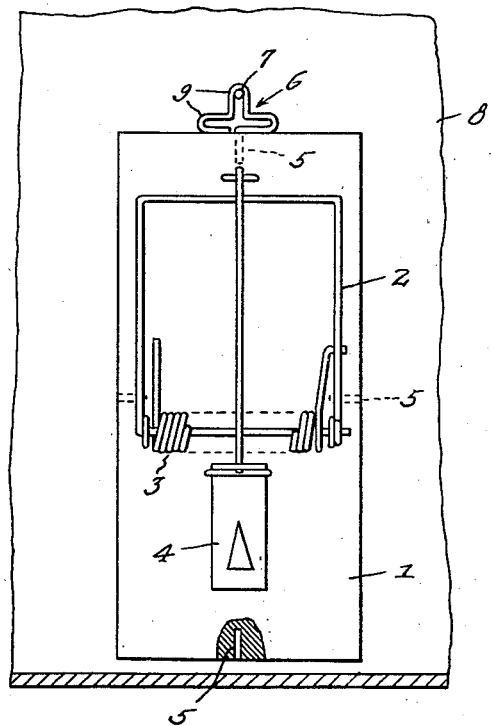
Figure 1 is a view in front elevation, showing a rat trap embodying the present invention suspended on a support.
Figure 2:
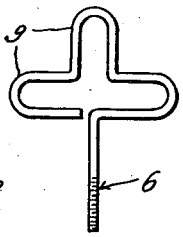
Figure 2 is a detail view of the eye screw by which the trap is suspended.

Referring now to the drawing in detail, it will be seen that the embodiment of the invention which has been illustrated comprises a substantially rectangular base 1 of suitable dimensions and material, preferably wood. Mounted on the base 1 is the usual wire jaw 2 which is actuated by a spring 3 and which is secured in set position by a trigger 4.

The base 1 has formed in each of its edges a socket 5. An eye screw 6 has a stem which is threadable selectively in the sockets 5. The eye screw 6 is for engagement over a nail 7 or the like for suspending the trap on a vertical support such as a wall 8 on one side of a rat runway. The eye of the screw 6 is formed to provide three U-shaped loops 9 disposed at right angles to each other and in any of which the nail 7 may be engaged for suspending the trap in different positions. That is, the trap may be suspended in a vertical position, as seen in Figure 1 of the drawing, or a horizontal position from either side, or by engaging the nail in either of the laterally projecting loops 9 the trap may be suspended at an inclination from either end or either side. This construction also facilitates turning the eye screw for inserting and removing same.

It is thought that the manner in which the invention functions will be readily apparent from a consideration of the foregoing. Briefly, the eye screw 6 may be expeditiously inserted in any of the sockets 5 for suspending the trap with the trigger lowermost, as seen in Figure 1, uppermost or toward either direction of a horizontal runway. Thus, the rat may always be caused to approach the trap from the trigger end thereof. Further, by suspending the trap from a vertical support, the rat, when caught, will be prevented from making off with said trap.

It is believed that the many advantages of a rat trap embodying the present invention will be readily understood, and although a preferred form of the device is as illustrated and described, it is to be understood that changes in the details of construction may be resorted to which will fall within the scope of the invention as claimed.

What is claimed is:

In combination with a rat trap embodying an elongated rectangular jaw-carrying base having a socket extending into each side edge and each end edge thereof midway between the ends of said edges, an eye screw having a stem threadable selectively in any desired one of the sockets for suspending the base on a nail driven in a vertical support, said eye screw having its eye formed with three U-shaped loops disposed at right angles to each other to selectively receive the nail for suspension of the base from either side or either end horizontally or vertically or at an inclination.

EARL F. MEREDITH.